(No Model.) 6 Sheets—Sheet 1.

J. ZIMMERMANN.
HUB BORING MACHINE.

No. 499,772. Patented June 20, 1893.

WITNESSES:
N. L. Humphries.
H. A. Carhart.

INVENTOR
John Zimmermann
By Smith & Denison
his ATTORNEYS.

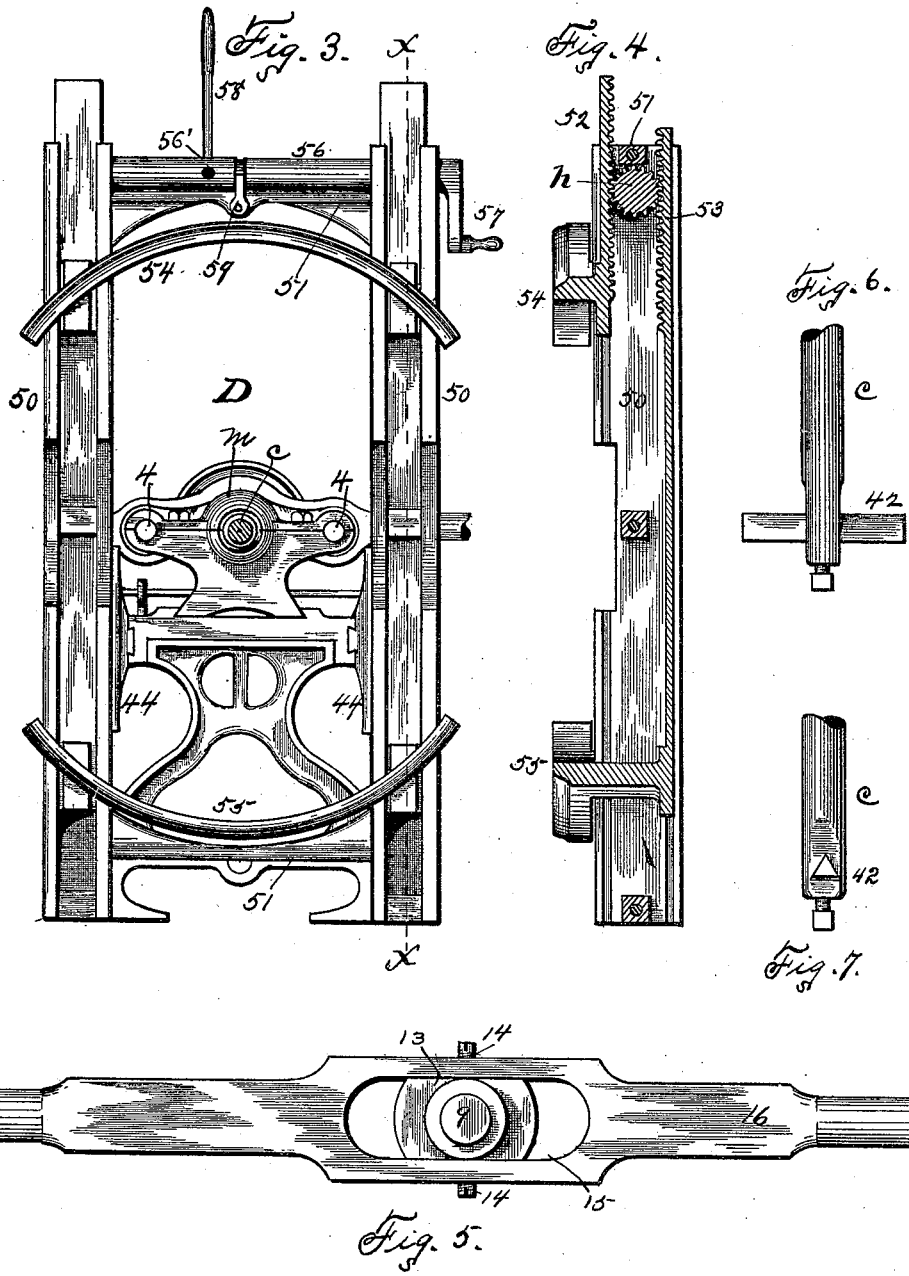

(No Model.) 6 Sheets—Sheet 3.
J. ZIMMERMANN.
HUB BORING MACHINE.
No. 499,772. Patented June 20, 1893.
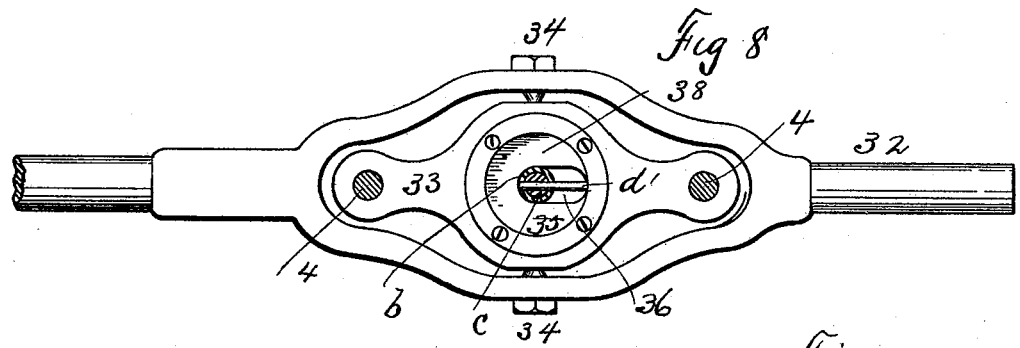
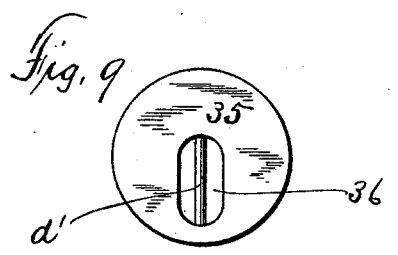
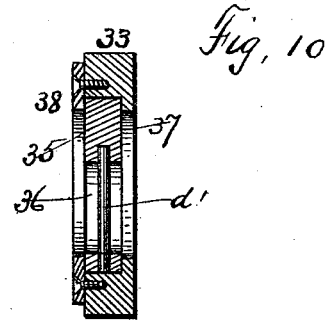
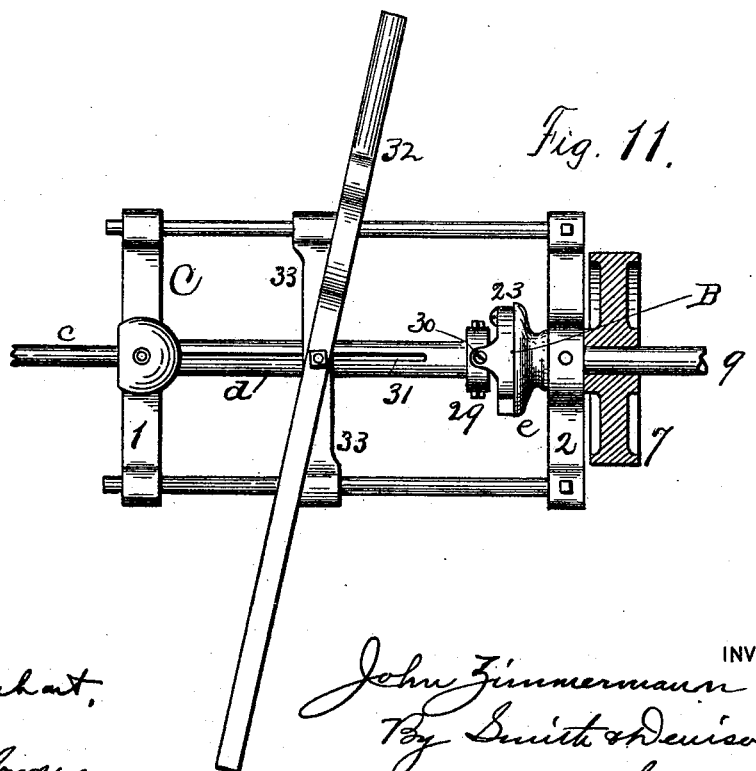
WITNESSES:
H. A. Cashart,
Geo. M. Blowers.
INVENTOR
John Zimmermann
By Smith & Denison
his ATTORNEYS.

(No Model.) 6 Sheets—Sheet 4.
J. ZIMMERMANN.
HUB BORING MACHINE.

No. 499,772. Patented June 20, 1893.

Witnesses
H. A. Carhart
C. B. Kinne

Inventor
John Zimmermann
By his Attorney
Smith & Denison (No Model.) 6 Sheets—Sheet 5.
J. ZIMMERMANN.
HUB BORING MACHINE.
No. 499,772. Patented June 20, 1893.
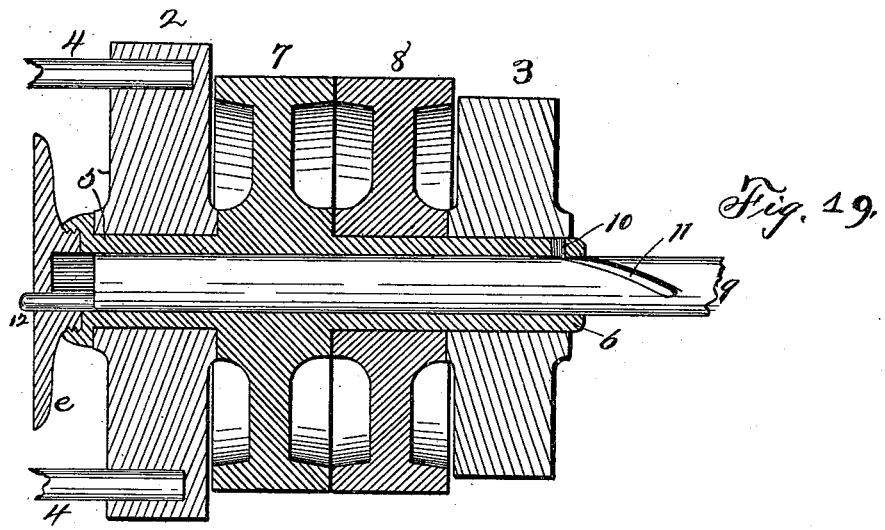
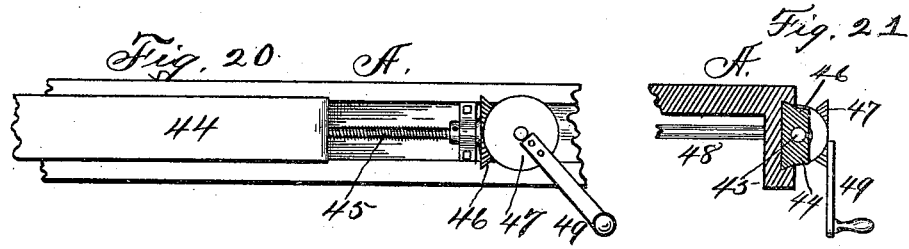
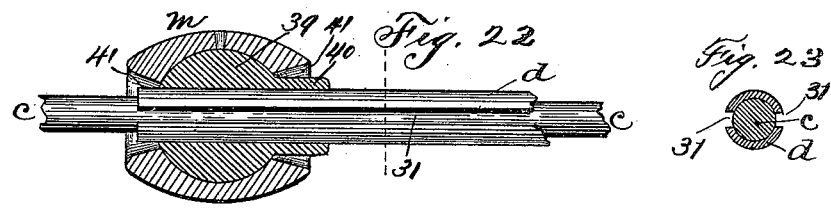
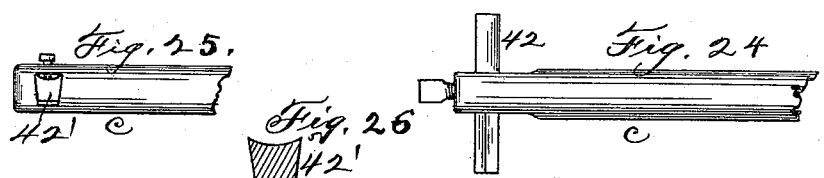
Witnesses
H. A. Carhart
C. B. Kinne
John Zimmermann Inventor
By his Attorney
Smith & Denison (No Model.) 6 Sheets—Sheet 6.

J. ZIMMERMANN.
HUB BORING MACHINE.

No. 499,772. Patented June 20, 1893.

WITNESSES:
H. A. Carhart
C. B. Kinne

INVENTOR.
John Zimmermann
BY
Smith & Dunison
ATTORNEYS

UNITED STATES PATENT OFFICE.

JOHN ZIMMERMANN, OF SYRACUSE, NEW YORK.

HUB-BORING MACHINE.

SPECIFICATION forming part of Letters Patent No. 499,772, dated June 20, 1893.

Application filed March 5, 1891. Serial No. 383,909. (No model.)

*To all whom it may concern:*

Be it known that I, JOHN ZIMMERMANN, of Syracuse, in the county of Onondaga, in the State of New York, have invented new and useful Improvements in Hub-Boring Machines, of which the following, taken in connection with the accompanying drawings, is a full, clear, and exact description.

My invention relates to hub-boring machines, and to that class in which the wheel is held stationary in a chuck gripping the fellies, while the boring is being done by means of a rotating boring bar to which the power is directly applied; in which the boring bar consists of sections, one solid and the other tubular, coupled together so that the length of said bar can be varied in use, by feeding one section toward the wheel to carry the cutting tool into and through it, either boring a straight, tapered or shouldered hole, as desired.

The object of my invention is to produce a machine of improved construction adapted to be used for any purpose to which a machine of its class can be adapted.

My invention consists in the several novel features of construction and operation which are hereinafter described and which are specifically set forth in the claims hereunto annexed. It is constructed as follows, reference being had to the accompanying drawings, in which—

Figure 1:
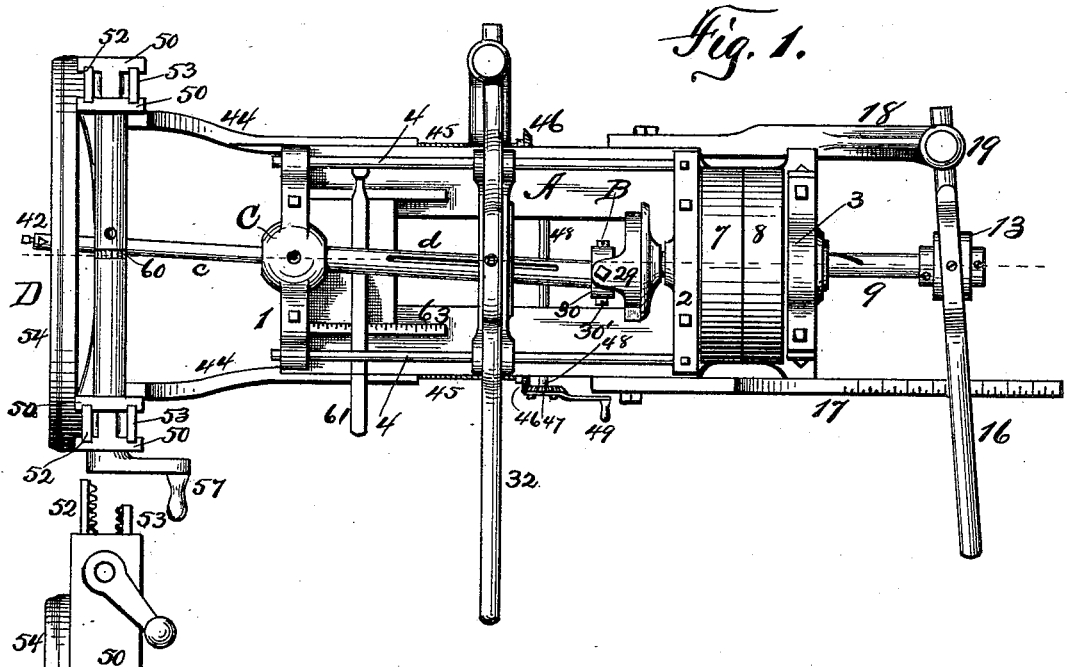
Figure 2:
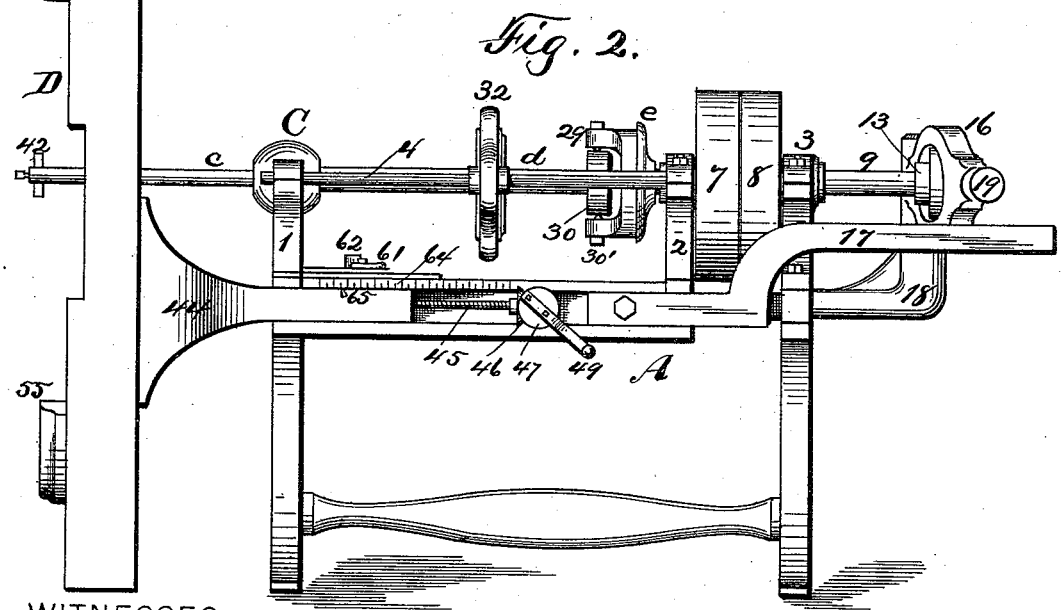
Figure 12:
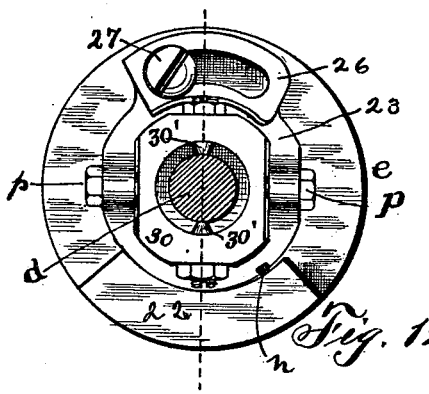
Figure 13:
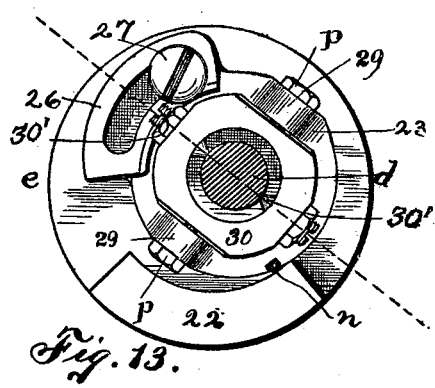
Figure 14:
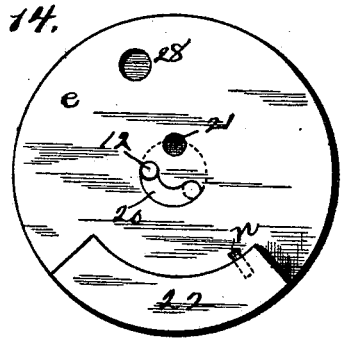
Figure 15:
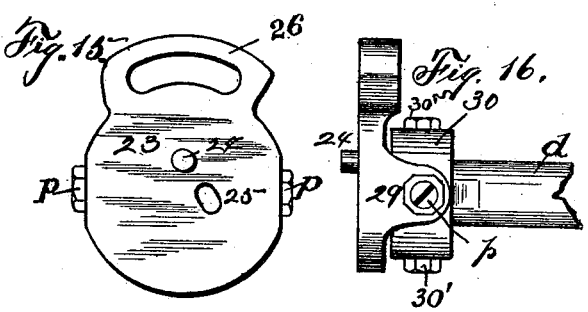
Figure 16:
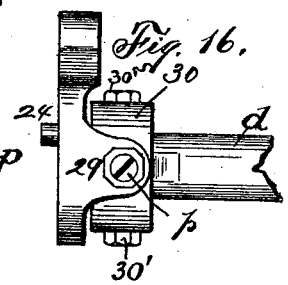
Figure 17:
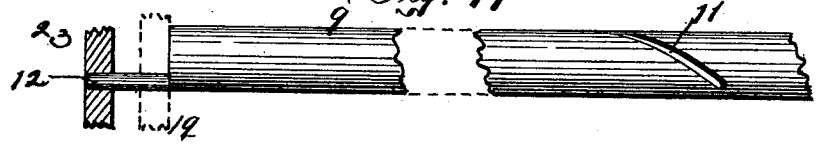
Figure 18:
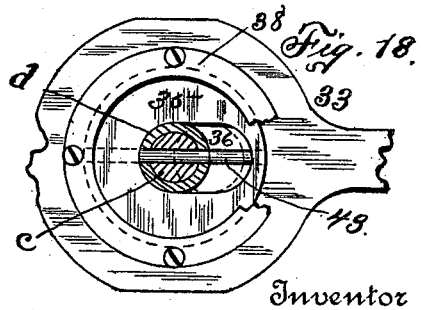
Figure 27:
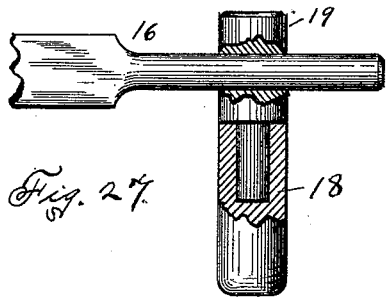
Figure 28:
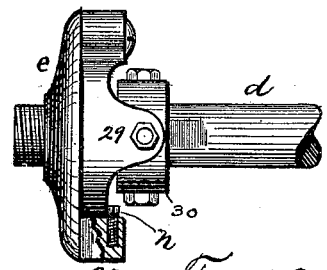
Figure 29:
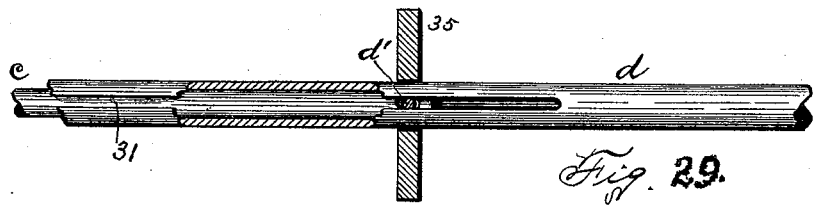

Figure 1, is a top plan of the machine. Fig. 2, is a side elevation thereof. Fig. 3, is a front elevation thereof. Fig. 4, is a vertical section on line *x x*, Fig. 1. Fig. 5, is an elevation of the lever for shifting the chuck to throw the boring bar off from the center. Fig. 6, is an elevation of the boring bar showing a knife triangular in cross section inserted through it. Fig. 7, is another elevation of the same. Fig. 8, is an enlarged front elevation of the boring bar guide and holder, showing in section the rods upon which it is supported and travels. Fig. 9, is an elevation of the disk through which the boring bar passes in the guide. Fig. 10, is a vertical section of said disk and the holder thereof. Fig. 11, is a top plan of the frame which carries the boring bar, the guide therefor, and the chuck for carrying the rear end of said bar. Fig. 12, is a front elevation of the boring-bar chuck, showing the boring bar in section, and on the center in the chuck as when boring a cylindrical hole. Fig. 13, is a like view of the same, showing the boring bar off from the center as in boring a tapered hole. Fig. 14, is a front elevation of the body of the chuck with the shifter removed. Fig. 15, is a side elevation of the shifter. Fig. 16, is a side elevation showing the connection of the shifter to the head holding the bar. Fig. 17, is an elevation of the cam shaft and the eccentric pin in its front end. Fig. 18, is a sectional elevation of the front of the boring bar guide showing the sleeve and tool bar therein, in section, and mounted upon the pin in the slotway in the rotating disk. Fig. 19, is a sectional elevation of the drive shaft, the fast and loose pulleys thereon and the shaft mountings. Fig. 20, is an enlarged detail of the hand feed by which the wheel is adjusted with reference to the boring bar. Fig. 21, is a sectional elevation of the same on a line transverse to Fig. 21, showing part of the cross rod. Fig. 22, is a sectional detail of the ball and socket bearing of the front part of the boring bar. Fig. 23, is a transverse section on line *a, a,* in Fig. 23, of the boring bar and sleeve. Fig. 24, is a side elevation of part of the boring bar showing a knife inserted therein which is trapezoidal in cross section. Fig. 25, is a top plan of the same looking at the trapezoidal knife, except that it shows the set screw inserted through the side of the bar, instead of into the end. Fig. 26, is a cross section of the knife. Fig. 27, is an enlarged view of the lever and pins parts of the lever being broken away to show its internal construction. Fig. 28, is a view of the chuck, holding the pin —*n*—. Fig. 29, is a view partly in section of the boring bar, its guide-plate, and the pin connections between said guide-plate and the tool carrying sections of the boring bar.

A—, is the main frame comprising a table and legs, and upon the table the blocks 1, 2 and 3, the block —1— being mounted in slideways on the top of the table, while the others are stationary. In the blocks 2 and 3 the hub projections 5 and 6 of the drive pulley —7— are journaled (Fig. 20) and —8— is the loose pulley rotating upon the hub —6—. The cam shaft —9— is passed through the hub of the drive pulley, and is connected thereto by a pin —10— through the hub engaging with a spiral groove in the shaft. The outer end of this shaft is provided with a pin —12— set therein adjacent to its periphery (Fig. 17). The rear end of this cam shaft is mounted in a holder 13 which is swiveled upon the points of the screws —14— in a slot —15— in the lever —16—. Upon the edges of the table I secure the arm —17— and —18— (Figs. 1 and 2) and in the arm —18— I swivel a stud —19— in which (see Fig. 28) the rear end of the lever —16— has a bearing, while the other, or projecting end, rests upon the arm —17—, and by operating this lever the cam shaft is moved forward or back for the reasons hereinafter set forth.

To the inner end of the drive shaft I connect the chuck —B—, (Figs. 12 to 16.) This chuck comprises the following parts: A back-plate —e— is secured or cast upon the hub —5—, (Fig. 20) and is provided with a concentric slot —20— (Fig. 14) in which the pin —12— which is secured in the end of the shaft —9—, off from its center, fits loosely and forms the connection of said shaft to said plate; said plate being also provided with a hole —21— and along its lower edge with a counterbalance block —22—, of substantially the form shown, and a pin —n— is secured in this block in such manner that it stands in front of the lower edge of the shifter —23— and prevents its lower edge from swinging outward away from the back-plate. This shifter —23— is connected to the front of the back plate by the hole —21— which receives the stud —24— and the stud —12— projecting through the back-plate, fits into the diagonal slot —25—, when the drive shaft is thrown forward. The upper edge of this shifter is also provided with a slotted extension —26— through which the screw —27— passes, entering the hole —28—, in the back-plate —e—, fitting loosely through the slot so that the shifter can be swung easily upon the stud —24— as a pivot, without loosening the screw. It is also provided on two sides with the forward projecting flanges —29—, through which the swivel screws p are inserted, forming a swivel bearing for the central recessed head 30, which in turn is pivotally secured to the rear end of the boring bar by screws 30'.

The boring bar mechanism consists of a knife bar —c— and a tubular sleeve —d— receiving the rear end of said bar, the rear end of said sleeve being secured in the clutch as aforesaid. The sleeve is slotted longitudinally, and —d'— is a pin inserted through the bar and the slot in the sleeve, connecting them, and it traverses the slot as the tool bar is moved forward or back, as hereinafter described. The rear end of the sleeve is normally central to the chuck, and to the drive pulley, and then the boring bar will bore a cylindrical hole.

In Fig. 13, the chuck is set for boring a tapered hole, by loosening the setscrew —27—, if necessary, moving the shifter over to the left, bringing the set screw in the other end of the slot, bringing the pin —12— into the other end of the slot in the back-plate, as is shown by the dotted lines in Fig. 14, and simultaneously throwing the cam shaft 9 forward by the lever —16—, so that the rear end of the sleeve, is then eccentric to the back-plate. This sleeve is provided with a longitudinal slit or slits —31—, opposite each other when two are used (Figs. 24 or 11) extending forward through the rocking or ball bearing —C— in the block, —1—.

The cutting tool carrier (or front section of the boring bar) is fed by hand, by the lever —32— (Figs. 8 to 11 and 19) which is enlarged centrally and adapted to receive the guide piece —33— which is mounted and adapted to slide upon the guide rods —4— and is connected to the lever by the swivel points of the screws —34—. The guide —33— is perforated and recessed centrally to receive the disk —35—, provided with a diametrical slot —36— and held in place between the flange —37—, and the removable ring —38—, and the sleeve (and bar within it) passes through this slot centrally, as shown in Fig. 8, when in position for boring a cylindrical hole; and when the boring mechanism is shifted, at the chuck, to bore a tapered hole, then the sleeve will lie in the outer end of the slot or toward it, and the oscillatory rotation of the sleeve will rotate the disk in its seat in the guide. The forward end of the sleeve (and tool carrying bar carried by it) is mounted in a ball and socket bearing —C— (Fig. 23) consisting of a ball —39— and a stud —40— on one side through both of which the sleeve passes, diametrically to said ball; said ball is seated in the holder —m— having outwardly flaring openings —41— in its ends, and the oscillatory rotation of the rear end of the sleeve will rock and rotate the ball in its seat.

In the bar —c— I mount the cutting knife, shown here in two forms, the one —42— being triangular, and the other —42'— being trapezoidal in cross section.

When the lever 32 is thrown forward the tool bar is moved forward by means of the pin —43— (Fig. 19) inserted diametrically through the disk —35—, the sleeve and said bar, said pin being longitudinal and central to the slot —36— in said disk. This pin is rigid in the disk, but passes loosely through the tool bar to permit said bar to slide upon it, so that the oscillation of the sleeve (and tool bar) when a tapered hole is being bored, is all taken up by the sliding of the bar upon the pin.

The edges of the table are provided with dovetail grooves, or ways (Fig. 3) in which I mount the bars —44— (Figs. 1 and 2) adapted to be simultaneously adjusted back and forth in said grooves by the screws —45— (one on each side) which are actuated by the bevel gears —46— and —47— and the cross shaft —48—, the gear —47— being rotated by the crank handle —49—

(Figs. 1 and 2;) and by this mechanism, I adjust forward or back, the wheel chuck —D—, which is carried upon the outer ends of said bars. This chuck consists of a frame composed of parallel sides —50—, secured together at the top and bottom by cross rods —51—; and these sides are grooved vertically in their inner edges to receive the rack bars —52— and —53— and the pinion —h— between them in engagement with both, so that when this pinion, (Fig. 4) is rotated to the left, the rack bar —52— is lowered and the rack bar —53— is raised. Upon the outer faces of the rack-bar —52— a curved felly grip —54— is mounted and upon the rack bars —53— a like grip 55 is mounted, both grips being curved upon the same radius, and these grip the felly of the wheel on opposite sides, and hold the hub in alignment with the tool carrying bar. At the normal point these grips are concentric with the tool bar, and then as they are moved in or out the length of their grip upon the felly will vary, but they will still hold the hub of the wheel in proper alignment for boring. A shaft —56— connects the pinions —h— in the sides and it is rotated by the crank —57—; and —58— is a tightening lever, inserted into the holes —56'— in the shaft, and —59— is a pawl engaging with a rack —60— upon said shaft —56— and holding the grips when set upon a wheel, and tightened up.

The mounting of the block —1— in a sliding base (Fig. 1) and of the ball bearing —C— in this block, enables me by means of the lever —61—, mounted in post —62—, and connected to this base, to move this block and bearing in or out, or toward or from the chuck —B— and to give more or less circular movement to the outer end of the boring bar, when the rear end is off from the center, and thus increase or diminish the size of the hole being cut. The scale —63— regulates the movement of this block, and the size of the hole bored according to its position by the scale.

For boring large straight bores or enlargements for nuts or collars, I throw the boring bar off from the center, set the block —1— so that the knife will start to cut the proper size of hole, and then operating the screws —45— can move the arms —44— and the wheel chuck forward or back the desired distance for the length of the bore.

The cam shaft —9— is not a drive shaft, but simply operates to throw the chuck shifter (or boring bar) off from the center more or less according to the distance it is moved in or out, thus regulating the taper of the hole to be cut, and the scale on the arm —17— indicates the taper and the distance the lever —16— should be moved to produce the taper desired.

The scale —64— on the edge of the table and the pointer —65— on the arm —44— indicate the distance the wheel chuck is moved in or out by the screws —45—.

The function of the counterbalance (Figs. 12 and 13) is to balance the chuck when the boring bar is thrown off from the center, by moving the shifter, when it counter balances the loop —26— and screw —27— (on the left in Fig. 13) and also that part of the shifter itself which is thrown over as aforesaid.

What I claim as my invention, and desire to secure by Letters Patent, is—

1. The combination with the boring bar consisting of a longitudinally slotted sleeve, and a tool bar inserted into and connected to said sleeve by a pin through it and said slot, of a chuck receiving the rear end of said sleeve and adapted to be shifted to throw that end of the sleeve off from the center and means to rotate the chuck.

2. A tool bar connected to a feed lever, a sleeve slotted longitudinally and receiving the tool bar, and a pin in said slot secured in said tool-bar and guiding it in its longitudinal movements in, and connecting it to the sleeve, in combination with a chuck holding the rear end of said sleeve, and adapted to throw it off from the center, and means to rotate the chuck.

3. The combination with the boring bar, of a chuck holding the rear end thereof, consisting of a back-plate provided with a slot —20— and a pivot hole —21—, a shifter connected to the back-plate by a pivot pin —24— and a head mounted in the shifter and recessed to receive the rear end of the boring-bar, and a cam shaft engaging with the shifter through the slot in the back-plate, and means to shift the cam-shaft.

4. The combination with the boring-bar consisting of a tool-bar and a slotted sleeve connected together by a transverse pin, of a chuck holding the rear end of the sleeve, and adapted to be shifted to throw the rear end off from the center, and a ball and socket bearing through which the sleeve passes, an intermediate guide in which it rotates, and a feed lever connected to the guide by a swivel connection.

5. The combination with the boring bar consisting of a bar and sleeve connected thereto by a transverse pin, and the chuck holding the rear end of the sleeve, and adapted to be shifted to throw it off from the center, of a feed lever, a guide mounted and adapted to slide upon guide rods, and connected to the feed lever by set screws, and a circular disk mounted and adapted to be rotated in the guide by the rotation of the boring bar and the sleeve passing through it.

6. The combination with the boring bar, consisting of a bar and a sleeve connected to it, and a chuck holding the rear end of the sleeve adapted to be shifted to throw it off from the center, of a feed lever, a rotating disk therein through which the boring-bar passes and rotated by the rotation of the chuck, and a pin connecting said bar to said disk.

7. The combination with the boring-bar consisting of a bar and a sleeve connected thereto, a chuck holding the rear end of the sleeve and adapted to be shifted to throw it off from the center, and the ball and socket bearing through which said sleeve passes, of a feed lever, a rotating disk mounted therein and through which the boring bar passes, and means to connect the boring bar to said disk.

8. The combination with the chuck holding the rear end of the boring bar, and adapted to be shifted to throw that end of said bar off from the center, and the drive pulley carrying said chuck upon its hub, of the cam-shaft grooved spirally, passing through said hub, and engaging with the chuck, a pin fitting in said groove, a lever connected to said cam-shaft and a scale regulating the distance said lever and shaft are moved to throw the boring bar off from the center.

9. The combination with the chuck adapted to be shifted eccentrically, of the boring-bar consisting of a sleeve and a tool-bar, the feed lever, and the disk therein to which the tool bar is connected, said sleeve through which and the tool-bar said disk connection passes, being slotted longitudinally and extending from the chuck forward through said disk, and a ball and socket bearing receiving said sleeve.

10. The combination with the boring bar consisting of a tool-bar, and a sleeve connected together, the feed lever, the guide therein, the disk in said guide, provided with a diametrical slot-way, of a pin secured in said slot, and passing through the tool-bar, and the slot in the sleeve, so that the tool-bar can slide longitudinally in the slot in said disk upon said pin.

In witness whereof I have hereunto set my hand this 10th day of November, 1890.

JOHN ZIMMERMANN.

In presence of—
H. P. DENISON,
ELMER E. KNOWLES.